L. DINESEN.
VALVE CAGING FOR MILKING MACHINES.
APPLICATION FILED JUNE 27, 1917.
1,264,377.
Patented Apr. 30, 1918.
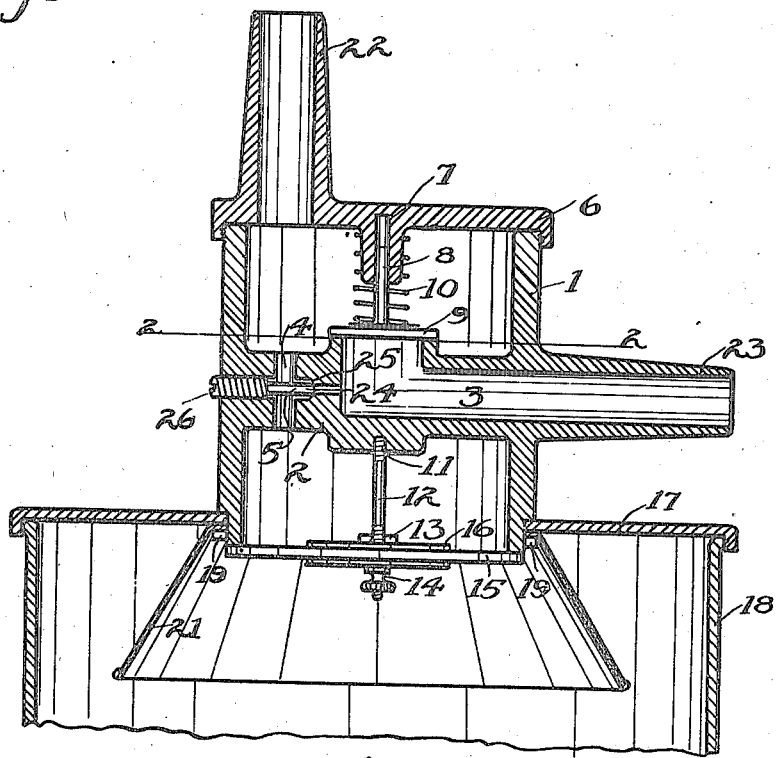
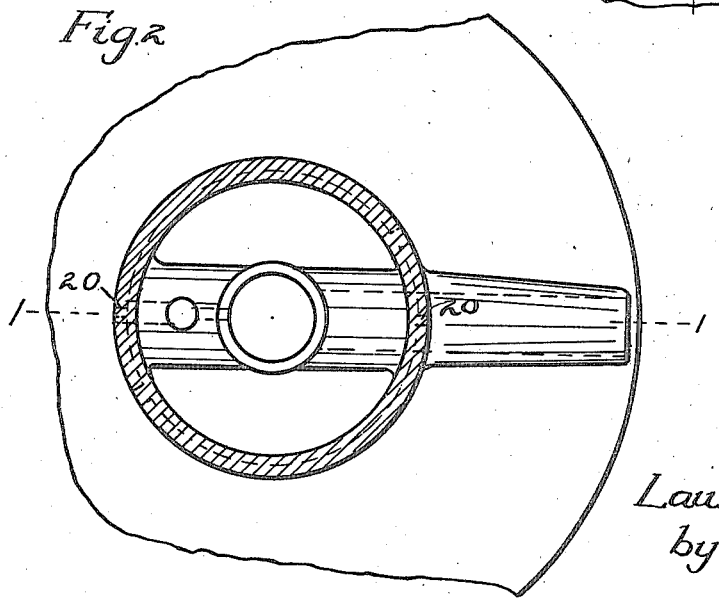
Inventor:
Laurits Dinesen
by C. B. Enochs
Attorney dent that on the upstroke of the pump a par-
UNITED STATES PATENT OFFICE.

LAURITS DINESEN, OF MINNEAPOLIS, MINNESOTA, ASSIGNOR TO PERFECTION MANUFACTURING COMPANY, OF MINNEAPOLIS, MINNESOTA, A CORPORATION OF MINNESOTA.

VALVE-CAGING FOR MILKING-MACHINES.

1,264,377.

Specification of Letters Patent.   Patented Apr. 30, 1918.

Application filed June 27, 1917.   Serial No. 177,591.

*To all whom it may concern:*

Be it known that I, LAURITS DINESEN, a citizen of the United States, and a resident of Minneapolis, in the county of Hennepin and State of Minnesota, have invented certain new and useful Improvements in Valve-Cagings for Milking-Machines, of which the following is a specification.

One object of my invention is to provide in a valve caging for milking machines a simple and efficient form of valve for opening and closing the air connection between the pump and the teat cups.

Another object of my invention is to provide in a valve caging for a milking machine an independent valve for closing the valve caging against the admission of air from the milk receptacle.

Another object of my invention is to provide a deflector to direct the discharge milk downwardly into the milk receptacle.

Another object of my invention is to provide an adjustable relief valve adapted to relieve the vacuum in the teat cup between the strokes of the pump.

With these and incidental objects in view the invention consists of certain novel features of construction and combination of parts, the essential elements of which are hereinafter described with reference to the drawing which accompanies and forms a part of this specification.

In the drawing Figure 1 is a section taken on the line 1—1, Fig. 2, and Fig. 2 is a fragmentary section taken on the line 2—2, Fig. 1.

In my preferred construction I provide a housing 1, Fig. 1, which has preferably cast therein a cross member 2 having at one side an outlet 3 for the drawing therethrough of air and milk, and on the other side a vertically positioned cross-shaped opening comprising the vertical portion 4 and the horizontal portion 5 whose function will be hereinafter explained.

A cap 6, engaged by screw connection with the housing, serves to cover the upper portion of the housing and has centrally positioned therein a valve guide 7 in which the valve stem 8, carrying the valve 9, reciprocates under the influence of the suction pump and the compression spring 10.

Centrally mounted at 11 at the under side of the member 2 is a stud 12 which carries between nuts 13 and 14 a rubber washer or valve 15 reinforced by the two washers 16.

The cage housing is adapted to fit into a receptacle cover 17 which is placed on the milk receptacle 18 when the device is in use, and bayonet catches 19 are provided which pass through apertures 20 in the cover 17 provided for that purpose.

To deflect the milk downwardly I assemble with the housing and the cover 17 a conical shaped deflector 21 which is likewise provided with apertures for the passing therethrough of the bayonet catches 19.

A tubular stem 22 projecting upwardly from the cover 6 is adapted to be connected to any suitable sort of single stroke suction pump, or other suitable means, for creating vacuum of varying amounts, and a second stem 23 is provided in communication with outlet 3 for attaching thereto a flexible hose which carries at its other end any suitable form of teat cup.

As the action of milking machines is well known by those skilled in the art, and this invention applies only to the valve caging, the remainder of the machine is not described herein.

A needle valve 24 seating at 25 is carried by a screw 26 adjustable in the housing 1, so that the amount of clearance between the needle valve and its seat may be closely regulated.

With the construction as shown it is evident that on the upstroke of the pump a partial vacuum will be created in the stem 22 and the interior of the valve caging, the lower end of the caging being sealed by the rubber valve 15.

The vacuum, preferably about fifteen inches of water, will draw milk from the teats of the cow to which the machine is being applied, the milk flowing in through the stem 23 up past the valve 9 which has been lifted by the suction and will be discharged into the milk receptacle 18 on the return stroke of the pump.

The needle valve 24 serves to relieve the vacuum in the stem 23 and hence in the teat cup on the return stroke of the pump and is preferably adjusted so that the vacuum will fall from substantially fifteen inches of water to five inches of water, so that while there is always a certain amount of vacuum being exerted on the teat of the cow, the amount will vary with the pulsations of the pump and produce a satisfactory milking action.

While I have described my invention and illustrated it in one particular design, I do not wish it understood that I limit myself to this construction, as it is evident that the application of my invention may be varied in many ways within the scope of the following claims.

Claims:

1. In a valve caging for a milking machine the combination of a housing having a cross member therein, said cross member having a chamber therein terminating at one end in an outlet and at the other end in a valve seat, a valve normally closing said valve seat by spring pressure, said housing having means for connection above said valve to suction producing means, and a needle valve adapted to relieve the suction in said chamber.

2. In a valve caging for milking machines the combination of a housing, a removable closure for the top of said housing having an outlet therein for connection to suction producing means, a cross member in said housing having a chamber therein in which is an outlet for connection to a teat cup, the other end of said chamber forming a valve seat, a valve reciprocally mounted in said closure and adapted to seat on said valve seat under spring pressure, a suction closing valve positioned at the lower end of said housing, said cross member in said housing having an aperture leading from the interior of said housing to the interior of said chamber, and an adjustable needle valve for adjusting the amount of opening of said aperture.

3. In a milking machine valve caging the combination of a housing having three outlets, one for pump connection, one for teat cup connection, and one for discharge, a valve for closing said teat cup outlet, said housing being provided with a by-pass aperture around said valve, and adjustable means for determining the area of said aperture.

4. In a valve caging for a milking machine the combination with a housing having a cross member therein, said cross member having an outlet leading therefrom, and a valve opening and an additional aperture from said outlet to the interior of said housing, a valve normally closing said valve opening, and an adjustable needle valve for adjusting the area of said additional aperture from said opening through said cross member to the interior of said housing.

5. In a valve caging for milking machines the combination of a housing, means in said housing whereby suction produced in the interior thereof may be transmitted through an outlet therein, means for closing said outlet when the suction in said housing is lowered, adjustable means for relieving the suction in said outlet by the admission of air thereto from the interior of said housing and means for discharging liquid from said housing by gravity, said means being rendered inoperative by suction in said housing.

LAURITS DINESEN.